United States Patent [19]

Izbicki et al.

[11] Patent Number: 4,935,737
[45] Date of Patent: Jun. 19, 1990

[54] DATA SELECTION MATRIX

[75] Inventors: Kenneth J. Izbicki, Hudson; William E. Woods, Natick; Richard A. Lemay, Carlisle, all of Mass.

[73] Assignee: Bull HN Information Systems Inc., Billerica, Mass.

[21] Appl. No.: 927,632

[22] Filed: Nov. 5, 1986

[51] Int. Cl.[5] .................... H03K 19/20; H04Q 3/00
[52] U.S. Cl. ................ 340/825.83; 307/465; 340/825.79
[58] Field of Search .............. 340/825.83, 825.79, 340/825.8, 825.85, 365 S; 328/137, 152, 154; 307/465, 480; 368/82, 84; 379/165, 248, 306, 335; 364/900; 377/111

[56] References Cited

U.S. PATENT DOCUMENTS

| | | | |
|---|---|---|---|
| 3,619,583 | 11/1971 | Arnold | 307/465 X |
| 3,795,099 | 3/1974 | Tsurnishi | 368/84 X |
| 4,196,582 | 4/1980 | Hersberger et al. | 368/82 X |
| 4,214,213 | 7/1980 | Ferrie | 328/137 X |
| 4,331,893 | 5/1982 | Conners | 307/465 |
| 4,663,732 | 5/1987 | Robinson | 364/900 |

Primary Examiner—Ulysses Weldon
Attorney, Agent, or Firm—George Grayson; John S. Solakian; Gary D. Clapp

[57] ABSTRACT

A data selection matrix is disclosed which uses a plurality of programmed array logic (PAL) units having input thereto portions of binary words from a plurality of sources, the PALs being responsive to control words also input thereto to jointly select one of said sources of binary words and to select the arrangement of the portions of the binary words being input thereto from the selected source of binary words.

4 Claims, 6 Drawing Sheets

```
                      INPUT PIN #
        0  0   1  0   0   0  1  0  1  0  1  0  1
        2  1   8  4   5   6  5  7  4  8  3  9  1
M       W SELECTOR INPUT DESIGNATION
I
N
T
E       P  P   P  P   D   D  L  D  C  D  C  C  C
R       0  0   0  1   0   0  0  0  0  1  0  0  0
M       4  0   8  2   0   4  1  8  3  2  2  0  1
#                                                   OUTPUT
                                                    PIN  #
 0  -  -   -  -   -   -  -  -  -  -  -  -  0
 1  -  0   -  -   -   -  -  -  0  -  0  0  -        PIN 16
 2  0  -   -  -   -   -  -  -  0  -  1  0  -
 3  -  -   -  -   0   -  -  -  -  -  -  1  -
 4  -  -   -  -   -   0  -  -  1  -  -  0  -

8  -  -   -  -   -   -  -  -  -  -  -  -  -
 9  -  0   -  -   -   -  -  -  0  -  1  -  1
10  0  -   -  -   -   -  -  -  0  -  0  0  0        PIN 18
11  -  -   0  -   -   -  -  -  0  -  1  0  0
12  -  -   -  0   -   -  -  -  0  -  0  -  1
13  -  -   -  -   -   0  -  -  -  -  -  1  0
14  -  -   -  -   -   -  -  -  -  0  -  1  1
15  -  -   -  -   -   -  0  -  1  -  -  0  -

16  -  -   -  -   -   -  -  -  -  -  -  -  -
17  -  0   -  -   -   -  -  -  0  -  0  -  1
18  0  -   -  -   -   -  -  -  0  -  1  -  1        PIN 17
19  -  -   0  -   -   -  -  -  0  -  0  0  0
20  -  -   -  0   -   -  -  -  0  -  1  0  0
21  -  -   -  -   0   -  -  -  1  -  -  -  1
22  -  -   -  -   -   -  -  0  -  -  -  1  0
23  -  -   -  -   -   -  -  0  1  -  -  -  0

24  -  -   -  -   -   -  -  -  -  -  -  -  1
25  -  -   0  -   -   -  -  -  0  -  0  0  -        PIN 19
26  -  -   -  0   -   -  -  -  0  -  1  0  -
27  -  -   -  -   -   -  0  -  -  -  -  1  -
28  -  -   -  -   -   -  -  -  1  0  -  0  -

56  -  -   -  -   -   -  -  -  -  -  -  -  -
57  -  0   -  -   -   -  -  -  0  -  1  0  0
58  0  -   -  -   -   -  -  -  0  -  0  -  1        PIN 12
59  -  -   0  -   -   -  -  -  0  -  1  -  1
60  -  -   -  0   -   -  -  -  0  -  0  0  0
61  -  -   -  -   -   0  -  -  1  -  -  -  1
62  -  -   -  -   -   -  -  -  -  0  -  1  0
63  -  -   -  -   -   -  -  -  1  0  -  -  0
```

FIG. 2

INPUT PIN #

| MINTERM # | 02 | 01 | 03 | 04 | 05 | 06 | 15 | 07 | 14 | 08 | 13 | 09 | 11 | OUTPUT PIN # |
|---|---|---|---|---|---|---|---|---|---|---|---|---|---|---|
| X SELECTOR INPUT DESIGNATION ↓ | P05 | P01 | P09 | P13 | D01 | D05 | L02 | D09 | C03 | D13 | C02 | C00 | C01 | |
| 0 | – | – | – | – | – | – | – | – | – | – | – | – | 0 | PIN 16 |
| 1 | – | 0 | – | – | – | – | – | – | 0 | – | 0 | 0 | – | |
| 2 | 0 | – | – | – | – | – | – | – | 0 | – | 1 | 0 | – | |
| 3 | – | – | – | – | 0 | – | – | – | – | – | – | 1 | – | |
| 4 | – | – | – | – | – | 0 | – | – | 1 | – | – | 0 | – | |
| 8 | – | – | – | – | – | – | – | – | – | – | – | – | – | |
| 9 | – | 0 | – | – | – | – | – | – | 0 | – | 1 | – | 1 | PIN 18 |
| 10 | 0 | – | – | – | – | – | – | – | 0 | – | 0 | 0 | 0 | |
| 11 | – | – | 0 | – | – | – | – | – | 0 | – | 1 | 0 | 0 | |
| 12 | – | – | – | 0 | – | – | – | – | 0 | – | 0 | – | 1 | |
| 13 | – | – | – | – | – | 0 | – | – | – | – | – | 1 | 0 | |
| 14 | – | – | – | – | – | – | – | – | – | 0 | – | 1 | 1 | |
| 15 | – | – | – | – | – | – | 0 | – | 1 | – | – | 0 | – | |
| 16 | – | – | – | – | – | – | – | – | – | – | – | – | – | |
| 17 | – | 0 | – | – | – | – | – | – | 0 | – | 0 | – | 1 | |
| 18 | 0 | – | – | – | – | – | – | – | 0 | – | 1 | – | 1 | PIN 17 |
| 19 | – | – | 0 | – | – | – | – | – | 0 | – | 0 | 0 | 0 | |
| 20 | – | – | – | 0 | – | – | – | – | 0 | – | 1 | 0 | 0 | |
| 21 | – | – | – | – | 0 | – | – | – | 1 | – | – | – | 1 | |
| 22 | – | – | – | – | – | – | 0 | – | – | – | – | 1 | 0 | |
| 23 | – | – | – | – | – | – | 0 | 1 | – | – | – | – | 0 | |
| 24 | – | – | – | – | – | – | – | – | – | – | – | – | 1 | |
| 25 | – | – | 0 | – | – | – | – | – | 0 | – | 0 | 0 | – | PIN 19 |
| 26 | – | – | – | 0 | – | – | – | – | 0 | – | 1 | 0 | – | |
| 27 | – | – | – | – | – | – | 0 | – | – | – | – | 1 | – | |
| 28 | – | – | – | – | – | – | – | – | 1 | 0 | – | 0 | – | |
| 56 | – | – | – | – | – | – | – | – | – | – | – | – | – | |
| 57 | – | 0 | – | – | – | – | – | – | 0 | – | 1 | 0 | 0 | |
| 58 | 0 | – | – | – | – | – | – | – | 0 | – | 0 | – | 1 | PIN 12 |
| 59 | – | – | 0 | – | – | – | – | – | 0 | – | 1 | – | 1 | |
| 60 | – | – | – | 0 | – | – | – | – | 0 | – | 0 | 0 | 0 | |
| 61 | – | – | – | – | – | 0 | – | – | 1 | – | – | – | 1 | |
| 62 | – | – | – | – | – | – | – | – | – | 0 | – | 1 | 0 | |
| 63 | – | – | – | – | – | – | – | – | 1 | 0 | – | – | 0 | |

*FIG. 3*

INPUT PIN #

| Minterm # | 02 | 01 | 03 | 04 | 05 | 06 | 15 | 07 | 14 | 08 | 13 | 09 | 11 | Output Pin # |
|---|---|---|---|---|---|---|---|---|---|---|---|---|---|---|
| Y Selector Input Designation → | P06 | P02 | P10 | P14 | D02 | D06 | L03 | D10 | C03 | D14 | C02 | C00 | C01 | |
| 0 | - | - | - | - | - | - | - | - | - | - | - | - | 0 | |
| 1 | - | 0 | - | - | - | - | - | - | 0 | - | 0 | 0 | - | PIN 16 |
| 2 | 0 | - | - | - | - | - | - | - | 0 | - | 1 | 0 | - | |
| 3 | - | - | - | - | 0 | - | - | - | - | - | - | 1 | - | |
| 4 | - | - | - | - | - | 0 | - | - | 1 | - | - | 0 | - | |
| | | | | | | | | | | | | | | |
| 8 | - | - | - | - | - | - | - | - | 0 | - | 1 | - | - | |
| 9 | - | 0 | - | - | - | - | - | - | 0 | - | 1 | - | 1 | |
| 10 | 0 | - | - | - | - | - | - | - | 0 | - | 0 | 0 | 0 | |
| 11 | - | - | 0 | - | - | - | - | - | 0 | - | 1 | 0 | 0 | PIN 18 |
| 12 | - | - | - | 0 | - | - | - | - | 0 | - | 0 | - | 1 | |
| 13 | - | - | - | - | - | 0 | - | - | - | - | - | 1 | 0 | |
| 14 | - | - | - | - | - | - | - | - | - | 0 | - | 1 | 1 | |
| 15 | - | - | - | - | - | - | 0 | - | 1 | - | - | 0 | - | |
| | | | | | | | | | | | | | | |
| 16 | - | - | - | - | - | - | - | - | - | - | - | - | - | |
| 17 | - | 0 | - | - | - | - | - | - | 0 | - | 0 | - | 1 | |
| 18 | 0 | - | - | - | - | - | - | - | 0 | - | 1 | - | 1 | |
| 19 | - | - | 0 | - | - | - | - | - | 0 | - | 0 | 0 | 0 | |
| 20 | - | - | - | 0 | - | - | - | - | 0 | - | 1 | 0 | 0 | PIN 17 |
| 21 | - | - | - | - | 0 | - | - | - | 1 | - | - | - | 1 | |
| 22 | - | - | - | - | - | - | - | 0 | - | - | - | 1 | 0 | |
| 23 | - | - | - | - | - | - | - | 0 | 1 | - | - | - | 0 | |
| | | | | | | | | | | | | | | |
| 24 | - | - | - | - | - | - | - | - | - | - | - | - | 1 | |
| 25 | - | - | 0 | - | - | - | - | - | 0 | - | 0 | 0 | - | |
| 26 | - | - | - | 0 | - | - | - | - | 0 | - | 1 | 0 | - | |
| 27 | - | - | - | - | - | - | 0 | - | - | - | - | 1 | - | PIN 19 |
| 28 | - | - | - | - | - | - | - | - | 1 | 0 | - | 0 | - | |
| | | | | | | | | | | | | | | |
| 56 | - | - | - | - | - | - | - | - | - | - | - | - | - | |
| 57 | - | 0 | - | - | - | - | - | - | 0 | - | 1 | 0 | 0 | |
| 58 | 0 | - | - | - | - | - | - | - | 0 | - | 0 | - | 1 | |
| 59 | - | - | 0 | - | - | - | - | - | 0 | - | 1 | - | 1 | PIN 12 |
| 60 | - | - | - | 0 | - | - | - | - | 0 | - | 0 | 0 | 0 | |
| 61 | - | - | - | - | - | 0 | - | - | 1 | - | - | - | 1 | |
| 62 | - | - | - | - | - | - | - | - | - | 0 | - | 1 | 0 | |
| 63 | - | - | - | - | - | - | - | - | 1 | 0 | - | - | 0 | |

| MINTERM # | P07 | P03 | P11 | P15 | D03 | D07 | L04 | D11 | C03 | D15 | C12 | C00 | C01 | OUTPUT PIN # |
|---|---|---|---|---|---|---|---|---|---|---|---|---|---|---|
| | 02 | 01 | 03 | 04 | 05 | 06 | 15 | 07 | 14 | 08 | 13 | 09 | 11 | (INPUT PIN #) |
| 0 | – | – | – | – | – | – | – | – | – | – | – | – | 0 | |
| 1 | – | 0 | – | – | – | – | – | 0 | – | 0 | 0 | – | – | |
| 2 | 0 | – | – | – | – | – | – | 0 | – | 1 | 0 | – | – | PIN 16 |
| 3 | – | – | – | – | 0 | – | – | – | – | – | 1 | – | – | |
| 4 | – | – | – | – | – | 0 | – | – | 1 | – | – | 0 | – | |
| 8 | – | – | – | – | – | – | – | – | – | – | – | – | – | |
| 9 | – | 0 | – | – | – | – | – | 0 | – | 1 | – | 1 | | |
| 10 | 0 | – | – | – | – | – | – | 0 | – | 0 | 0 | 0 | | |
| 11 | – | – | 0 | – | – | – | – | 0 | – | 1 | 0 | 0 | | PIN 18 |
| 12 | – | – | – | 0 | – | – | – | 0 | – | 0 | – | 1 | | |
| 13 | – | – | – | – | – | 0 | – | – | – | – | 1 | 0 | | |
| 14 | – | – | – | – | – | – | – | – | 0 | – | 1 | 1 | | |
| 15 | – | – | – | – | – | – | 0 | – | 1 | – | – | 0 | – | |
| 16 | – | – | – | – | – | – | – | – | – | – | – | – | 1 | |
| 17 | – | 0 | – | – | – | – | – | 0 | – | 0 | – | 1 | | |
| 18 | 0 | – | – | – | – | – | – | 0 | – | 1 | – | 1 | | |
| 19 | – | – | 0 | – | – | – | – | 0 | – | 0 | 0 | 0 | | PIN 17 |
| 20 | – | – | – | 0 | – | – | – | 0 | – | 1 | 0 | 0 | | |
| 21 | – | – | – | – | 0 | – | – | 1 | – | – | – | 1 | | |
| 22 | – | – | – | – | – | – | 0 | – | – | – | 1 | 0 | | |
| 23 | – | – | – | – | – | – | 0 | 1 | – | – | – | 0 | | |
| 24 | – | – | – | – | – | – | – | – | – | – | – | 1 | | |
| 25 | – | – | 0 | – | – | – | – | 0 | – | 0 | 0 | – | | |
| 26 | – | – | – | 0 | – | – | – | 0 | – | 1 | 0 | – | | PIN 19 |
| 27 | – | – | – | – | – | 0 | – | – | – | – | 1 | – | | |
| 28 | – | – | – | – | – | – | – | 1 | 0 | – | 0 | – | | |
| 56 | – | – | – | – | – | – | – | – | – | – | – | – | – | |
| 57 | – | 0 | – | – | – | – | – | 0 | – | 1 | 0 | 0 | | |
| 58 | 0 | – | – | – | – | – | – | 0 | – | 0 | – | 1 | | |
| 59 | – | – | 0 | – | – | – | – | 0 | – | 1 | – | 1 | | |
| 60 | – | – | – | 0 | – | – | – | 0 | – | 0 | 0 | 0 | | PIN 12 |
| 61 | – | – | – | – | – | 0 | – | – | 1 | – | – | – | 1 | |
| 62 | – | – | – | – | – | – | – | – | – | 0 | – | 1 | 0 | |
| 63 | – | – | – | – | – | – | – | 1 | 0 | – | – | 0 | | |

| MINTERM # | INPUT PIN # | | | | | | | OUTPUT PIN # |
|---|---|---|---|---|---|---|---|---|
| | 02 | 01 | 03 | 04 | 05 | 16 06 | 07 | |
| | INPUT SIGNAL — REGISTER CONTROL INPUT | | | | | | | |
| | C01 | C00 | C02 | C03 | C04 | C05 | C06 | |
| 0 | – | – | – | – | – | – | – | |
| 1 | 1 | 1 | – | 0 | 1 | 1 | 1 | 19 |
| 8 | – | – | – | – | – | – | – | |
| 9 | 1 | 1 | – | 0 | 1 | 1 | 0 | 18 |
| 16 | – | – | – | – | – | – | – | |
| 17 | 1 | 1 | – | 0 | 1 | 0 | 1 | 17 |
| 24 | – | – | – | – | – | – | – | |
| 25 | 1 | 1 | – | 0 | 1 | 0 | 0 | 16 |
| 32 | – | – | – | – | – | – | – | |
| 33 | 0 | 0 | 0 | 0 | 0 | 1 | – | |
| 34 | 1 | 0 | 0 | 0 | 0 | 1 | 0 | 15 |
| 35 | 0 | 1 | – | 0 | 0 | 1 | – | LOAD |
| 36 | – | 0 | – | 0 | 1 | 1 | 1 | BUBBLE D |
| 37 | 0 | 1 | – | 0 | 1 | 1 | 1 | |
| 40 | – | – | – | – | – | – | – | |
| 41 | 0 | 0 | 0 | 0 | 0 | 1 | – | |
| 42 | 1 | 0 | 0 | 0 | 0 | 1 | 0 | 14 |
| 43 | 0 | 1 | – | 0 | 0 | 1 | – | C |
| 44 | – | 0 | – | 0 | 1 | 1 | 0 | |
| 45 | 0 | 1 | – | 0 | 1 | 1 | 0 | |
| 48 | – | – | – | – | – | – | – | |
| 49 | 0 | 0 | 0 | 0 | 0 | – | 1 | |
| 50 | 1 | 0 | 0 | 0 | 0 | 0 | 1 | 13 |
| 51 | 0 | 1 | – | 0 | 0 | – | 1 | B |
| 52 | – | 0 | – | 0 | 1 | 0 | 1 | |
| 53 | 0 | 1 | – | 0 | 1 | 0 | 1 | |
| 56 | – | – | – | – | – | – | – | |
| 57 | 0 | 0 | 0 | 0 | 0 | – | 1 | |
| 58 | 1 | 0 | 0 | 0 | 0 | 0 | 1 | 12 |
| 59 | 0 | 1 | – | 0 | 0 | – | 1 | A |
| 60 | 0 | 1 | – | 0 | 1 | 0 | 0 | |
| 61 | – | 0 | – | 0 | 1 | 0 | 0 | |

*FIG. 6*

DATA SELECTION MATRIX

FIELD OF THE INVENTION

This invention relates to circuits for rearranging portions of data words for use in a computer system.

BACKGROUND OF THE INVENTION

In the prior computer art and other art fields there are multiplexer circuits used to selectively choose one of a plurality of data sources, and there are other circuits used to select bits within binary words. The selector circuits are relatively complex and expensive and are more so if they have the flexibility of being programmable. Circuits performing the two functions are seldom if ever combined into a single circuit except by adding more components. Thus, there is a need in the art for a selection circuit that is relatively simple, that may jointly perform multiplex and selection functions without increase in cost or size, and that is programmable.

SUMMARY OF THE INVENTION

The foregoing needs of the prior art are filled by the present invention. A selection circuit is provided that can jointly provide both selection and multiplexing functions. The selection circuit utilizes commercially available Programmable Array Logic (PAL) integrated circuit chips that are programmed to meet specific selection and multiplexing requirements, coupled with conventional registers. The PALS have multiple inputs to each of which are input binary data words from different sources. Also input to the programmed PALS are control signals which act to control the multiplexing selection operation, and to select the order of groups of bits within each binary word that is input thereto.

DESCRIPTION OF THE DRAWING

FIGS. 2 through 5 are truth tables showing the programming of the PALS to perform the multiplexing and data selection in accordance with the teaching of the preferred embodiment of the invention; and FIG. 6 is a table showing programming of the PAL that is used to control the operation of registers that are used to temporarily store the output of the PALS that perform the selection and multiplexing.

DETAILED DESCRIPTION

Figure 1:
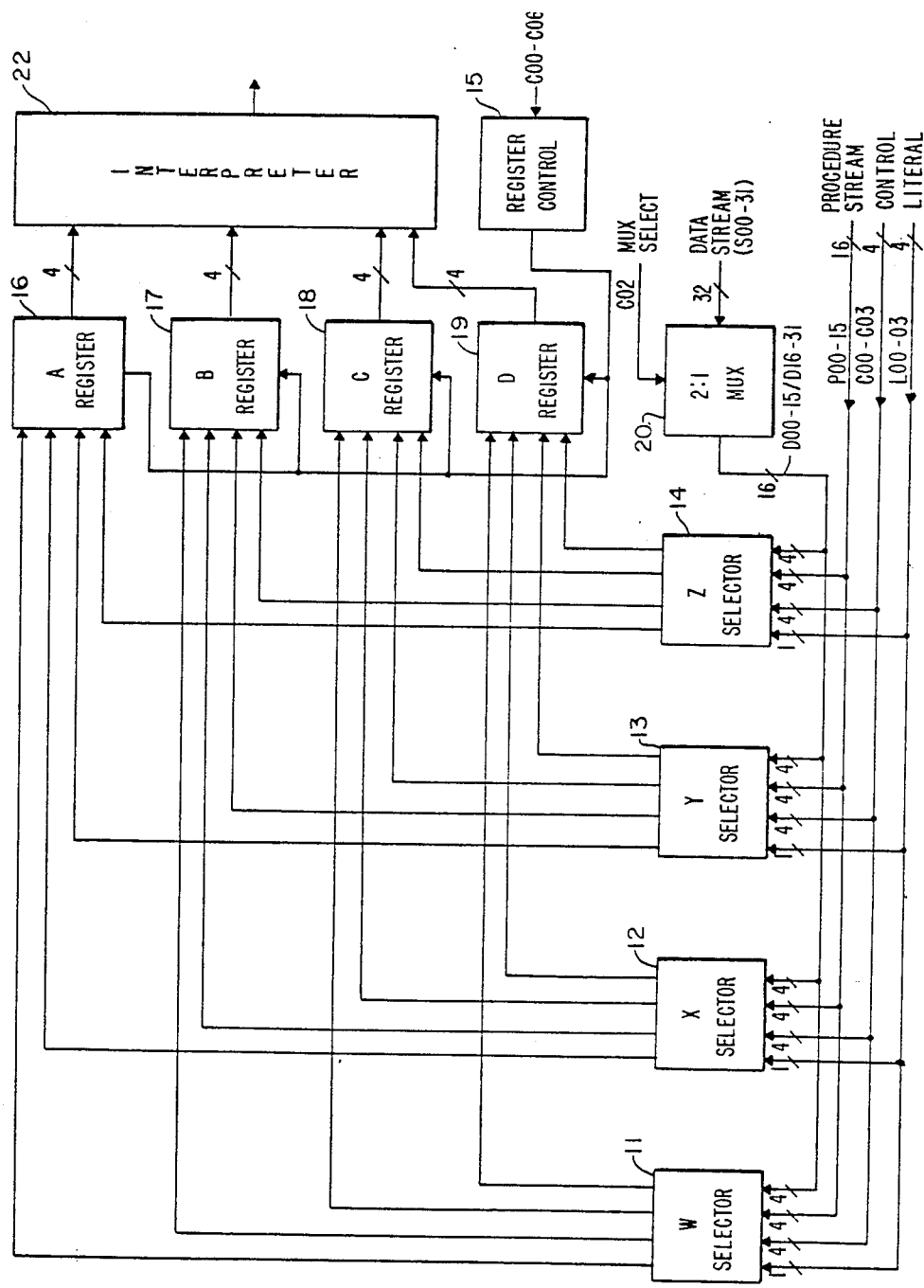
FIG. 1 is a detailed block diagram of the data selection matrix in accordance with the present invention.

In FIG. 1 is shown the detailed block diagram of the data selection matrix in accordance with the preferred embodiment of the invention. Selectors 11 through 14 and register control 15 are commercially available 16L8B programmable array logic circuits available from companies such as AMD. Registers 16 through 19 are each made from commercially available 74AS169 counters available from companies such as Texas Instruments. These counters can selectably operate as a counter or a register. Multiplexer 20 is made up of four commercially available 74S157 multiplexers. Interpreter 22 is not part of the present invention but is shown as an output from the novel data selection matrix.

The connections to and between the integrated circuit chips identified in the last paragraph is shown in Table 1 below. The programming of the PALS (12-16) is shown in the truth tables in FIGS. 2 through 6.

TABLE 1

| W selector 11 | |
|---|---|
| pins 16 and 19 | to register A, pin 6 |
| pin 18 | to register B, pin 6 |
| pin 17 | to register C, pin 6 |
| pin 12 | to register D, pin 6 |
| pins 1 through 4 | procedure inputs P00,04,08,12 |
| pins 5 through 8 | data inputs D00,04,08,12 |
| pins 9,11,13,14 | control inputs C00,01,02,03 |
| pin 15 | literal input L00 |
| X selector 12 | |
| pins 16 and 19 | to register A, pin 5 |
| pin 18 | to register B, pin 5 |
| pin 17 | to register C, pin 5 |
| pin 12 | to register D, pin 5 |
| pins 1 through 4 | procedure inputs P01,05,09,13 |
| pins 5 through 8 | data inputs D01,05,09,13 |
| pins 9,11,13,14 | control inputs C00,01,02,03 |
| pin 15 | literal input L01 |
| Y selector 13 | |
| pins 16 and 19 | to register A, pin 4 |
| pin 18 | to register B, pin 4 |
| pin 17 | to register C, pin 4 |
| pin 12 | to register D, pin 4 |
| pins 1 through 4 | procedure inputs P02,06,10,14 |
| pins 5 through 8 | data inputs D02,06,10,14 |
| pins 9,11,13,14 | control inputs C00,01,02,03 |
| pin 15 | literal input L02 |
| Z selector 12 | |
| pins 16 and 19 | to register A, pin 3 |
| pin 18 | to register B, pin 3 |
| pin 17 | to register C, pin 3 |
| pin 12 | to register D, pin 3 |
| pins 1 through 4 | procedure inputs P03,07,11,15 |
| pins 5 through 8 | data inputs D03,07,11,15 |
| pins 9,11,13,14 | control inputs C00,01,02,03 |
| pin 15 | literal input L03 |
| Register Control 15 | |
| pins 1 through 7 | control inputs C00 to C06 |
| enable counter function | |
| pin 19 | to register D, pins 7 & 10 |
| pin 18 | to register C, pins 7 & 10 |
| pin 17 | to register B, pins 7 & 10 |
| pin 16 | to register A, pins 7 & 10 |
| enable register function | |
| pin 15 | to register D, pin 9 |
| pin 14 | to register C, pin 9 |
| pin 13 | to register B, pin 9 |
| pin 12 | to register A, pin 9 |

In Table 1 above pins 16 and 19 of selectors 11, 12, 13 and 14 are indicated as both being output to Register A. For each of the selectors output pins are connected together as a "wire OR" due to the number of minterms needed.

There are two unidentified sources of representative streams of binary information in the form of multibit binary words that are input to the data selection matrix. They are a procedure stream of sixteen bit words (P00-P15) and a data stream of thirty-two bit words (S00-S31). In operation, one of these two streams of binary words is selected for processing and portions of each word in the selected stream are permuted as taught in this specification. Of the sixteen bits P00-P15 that make up each binary word of the procedure stream, bits P00,04,08,12 are input to W selector 11 as shown in Table 1 above. Similarly, the other procedure stream (P—) bits and the data stream (D—) bits are input to selectors 12 through 14 as indicated in Table 1.

The thirty-two data bits S00-31 input to the data selection matrix are divided into two groups S00-15 and S16-31, and one of these groups at a time is output by a 2:1 multiplexer 20 as bits D00-15 onto a sixteen bit bus. The D00-15 bits are applied as a group of four bits to each of selectors 11 through 14. The group of four bits applied to each of selectors 11 through 14 are shown in Table 1.

Another group of bits called the literal bits L00-L03 are also input to the data selection matrix. The literals are a firmware microcode input. As shown in Table 1, the highest order literal bit L00 is input to pin 15 of W selector 11, the next highest order literal bit L01 is input to pin 15 of X selector 12, literal bit L02 is input to pin 15 of Y selector 13, and the lowest order literal bit L03 is input to pin 15 of Z selector 14.

The operation of selectors 11 through 14 is controlled by the four bits C00-03 of the seven bit control word C00-06. More specifically, the four control bits C00-03 are input to each of selectors 11 through 14 to control their operation in selecting the bits input to the selectors. All the control bits C00-06 are input to register control circuit 15 to control its operation in enabling ones of registers 16 through 19 to operate as registers or counters as described in detail further in this specification. The input of these control bits to the PALS that are selectors 11 through 14 and register control 15 is shown in Table 1 above. The selection of data stream (D00-15) or procedure stream (P00-15) bits in selectors 11 through 14 responsive to the control bits C00-03 is shown in detail in FIGS. 2 through 5. The control of registers 16 through 19 by register control 15 (PAL) in response to control bits C00-06 is shown in FIG. 6.

Responsive to control bits C00-03 input to each of selectors 11 through 13, one of the four groups of four data or procedure bits input to each of selectors 11-14 is steered to particular ones of registers 16 through 19 as programmed into the selector PALS. An example of this steering is described further in this specification. As mentioned previously, commercially available registers 16 through 19 are controlled by control signals C00-06 via register control 15 to act as either registers or as counters in a manner well known in the art. This dual capability extends the usefulness of the novel data selection matrix.

The C02 bit of the seven bit control word C00-06 is also input to and is used to operate multiplexer 20 to select either input data bits S00-15 or S16-31 for input to selectors 11 through 14 as data bits D00-15. When the C02 bit is a one, multiplexer 20 selects bits S16 to S31 to be data bits D00-15 that are input to the selectors. Conversely, when the C02 bit is a zero, bits S00 to S15 are selected to be data bits D00-15.

Register control circuit 15 also has control signal bits C00-06 input thereto and its output leads are connected to the control inputs of individual ones of registers 16 through 19. The connection of these control signal bits to the PAL that is register control 15 are listed in Table 1, and the outputs from register control 15 responsive to the control signal are shown in detail in the truth table in FIG. 6. Register control 15 responds to the control signal at its input to generate signals to registers 16 through 19 that jointly enable the registers to act as registers and to only enable the ones of the registers that are supposed to store bits output from the selectors. Alternatively these signals to the control inputs of registers 16 through 19 enable them to act as counters.

Each of registers 16 through 19 has four input leads making a total of sixteen input leads and corresponding to the sixteen selected procedure or data input leads to selectors 11 through 14. The zero/one values of the sixteen bits respectively on each of the sixteen input leads to registers 16 through 19 may be changed from their values input to selectors 11 through 14 by the selection accomplished in the selectors. The connections between the outputs of selectors 11 through 14 and the inputs of registers 16 through 19 are shown in Table 1.

In FIG. 2 is shown a truth table for programming W selector 11. As mentioned at the beginning of this detailed description selectors 11 through 14 are commercially available 16L8B programmable array logic (PAL) circuits. The pin numbers at the top and on the right side of FIG. 2 are the data input and output pin numbers for this particular PAL. The input pin numbers at the top of FIG. 2 also have the particular input data, procedure, control and literal lead designations adjacent them. The connections between the output pins on the right side of FIG. 2 and registers 16 through 19 are given in Table 1. The minterm numbers of PAL 11 are correlated with the input and output pin numbers in FIG. 2 so that one skilled in the art can understand how selectors 11 through 14 are responsive to control signals C00-03 to select bits in this preferred embodiment of the invention.

Similarly, FIGS. 3 through 5 giving the truth tables for selectors 12 through 14 are identical to FIG. 2 in form and give information so that one skilled in the art can understand the operation of the preferred embodiment of the invention, and can thereby also program selector PALs 11 through 14 to implement alternative embodiments of the invention.

As can be seen in Table 1, the sixteen bit data (D00-15) or procedure (P00-15) words are divided into four groups of four bits apiece. Each of the four groups of four bits has one bit connected to an input of one of selectors 11 through 14. The highest order bit of each group is connected to W selector 11, the next highest order bit of each group is connected to X selector 12, the next to lowest order bit of each group is connected to Y selector 13, and the lowest order bit of each group is connected to Z selector 14. In operation, when a group bits is selected it has one bit coming out of each of selectors 11 through 14. Thus, for the highest order group of four bits, one selected bit comes out of each selector but, with the interconnections between selectors 11-14 and registers 16-19, the highest order group of four bits is stored in a selected one of registers 16 through 19. Similarly, the next highest order group of four bits coming out of selectors 11-14 is stored in another one of registers 16 through 19, excluding the register that the highest order group of bits is stored in. The next to lowest order group of four bits comes out of the four selectors and is stored in one of the two remaining register 16 through 19. Finally, the lowest order group of four bits coming out of selectors 11 through 14 is stored in the remaining one of registers 16 through 19.

FIG. 6 is identical in form to FIGS. 2 through 5 and shows a truth table for programming register control 15 which is also the same type of commercially available PAL as selectors 11 through 14. As mentioned previously, register control 15 responds to the control signals C00-06 input thereto to output control signals to registers 16 through 19 that determine whether they are to operate as counters or registers, and to enable particular ones of the registers to accept and store groups of bits from selectors 11 through 14.

In the following paragraphs is described an example of the operation of the data selection matrix in selecting a binary word from one of the two sources, data and procedure. The truth table in FIG. 2 is for W selector 11, the truth table in FIG. 3 is for X selector 12, the truth table in FIG. 4 is for Y selector 13, and the truth table in FIG. 5 is for Z selector 14.

In the example, a sixteen bit binary number D00-15 is present on the data stream bus output from 2:1 multiplexer 20, and another sixteen bit binary number P00-15 is present on the procedure stream bus. The value of these numbers on the data and procedure busses does not matter. Only the control number is important and it is used to select either the procedure bus or the data bus, and also specifies any selection of bits. The seven bit control number C00-06 is input to the data selection matrix. All bits C00-06 are input to register control 15, while bit C02 is input to 2:1 multiplexer 20, and bits C00-03 are input to each of selectors 11 through 14 as reflected in the truth tables in FIGS. 2 through 5. For this example, the control number C00-06 is 1010100 where C00=C02=C04=1 and C01=C03=C05=C06=0.

Using the above exemplary values for C00-03 input to the PALs that selectors 11 through 14 are implemented with, in FIG. 2, which is the truth table for W selector 11, we see that with C00=1 and C01=0, the requirement for minterm 3 is partially satisfied. Under minterm 3 C02=C03=don't care, which means that C02 and C03 can be either zero or one. Thus, minterm 3 is fully satisfied and will provide an output. For minterm 3 there is only one output and that is for input pin number 5 which has data signal D00 connected thereto. The signal on data lead D00 is connected output pin 16 of W selector 11.

When looking at FIGS. 3, 4 and 5 it can be seen that the truth table is the same as for FIG. 2. The input and output pins are the same. The difference is in the signals connected to the input pins. Thus, minterm 3 is enabled for FIGS. 3, 4 and 5 also. Thus, for X selector 12 in FIG. 3, the signal on lead D01 is output at pin 16; for Y selector 13, the signal on lead D02 is output at pin 16; and for Z selector 14, the signal on lead D03 is output at pin 16.

Thus, with the present example only the data signal on data leads D00-03 are selected by the control number and output from selectors 11 through 14 to be applied to the input to A register 16.

At the same time that the control number is controlling the operation of selectors 11 through 14, register control 15 is also responding to bits C00-06 of the control number per the truth table shown in FIG. 6. With the control number 1010100, we find that only minterm 60 is enabled per FIG. 6. This causes a signal to be output only on output pin 12 from register control 15 which is input to enable input pin G1 of A register 16 per Table A. None of the other registers 17 through 19 is enabled. The result is that only the portion of the data number on data leads D00-03 is stored in A register 16.

While what has been described hereinabove is the preferred embodiment of the invention, it would be obvious to those skilled in the art that many changes may be made without departing from the spirit and scope of the invention.

What is claimed is:

1. A data selection matrix for extracting a desired field from a chosen one of w data words, each of said words being subdivided into f fields of b bits each, said matrix comprising, in combination, w input ports, each input port consisting of f sets of b terminals per set, and each of said input ports being connected to an external source of one of said w data words such that each of said f sets of terminals receives one of said fields, b selector circuits, one for each of said b bits of said fields, each selector circuit comprising, in combination, w selector inputs each comprising f parallel input conductors, each of said input conductors being connected to a terminal in the corresponding one of the f sets of terminals in one of said w input ports, f selector output conductors, a control input for receiving a selector control signal, and means responsive to said selector control signal for connecting said selector output conductors to a chosen ones of said selector inputs; and f output registers each comprising, in combination, b register input conductors connected to a selector output of one of said b selector circuits, a register control input for receiving a register control signal, and means responsive to said register control signal for enabling or disabling said register, whereby the enabled one of said registers receives the b bits of said desired field from said b selection circuits and transmits said desired field to a utilization circuit.

2. A data selection matrix as set forth in claim 1 wherein each of said output registers operates selectively as a register or a counter and wherein said means responsive to said register control signal further selects the mode of operation of said register when it is enabled.

3. A data selection matrix as set forth in claim 1 or 2 wherein each of said selector circuits comprises a programmed logic array chip.

4. A data selection matrix as set forth in claim 1 or 2 wherein said register control signal is produced by a programmed logic array responsive to said selector control signal.

* * * * *